US008652636B2

(12) United States Patent
Beck et al.

(10) Patent No.: US 8,652,636 B2
(45) Date of Patent: Feb. 18, 2014

(54) DRIED NANOCRYSTALLINE CELLULOSE OF CONTROLLABLE DISPERSIBILITY AND METHOD THEREFOR

(75) Inventors: Stephanie Beck, Montreal (CA); Jean Bouchard, Montreal (CA); Richard Berry, Notre-Dame-de-l'Ile-Perrot (CA)

(73) Assignee: FPInnovations, Pointe-Claire, QC (CA)

( * ) Notice: Subject to any disclaimer, the term of this patent is extended or adjusted under 35 U.S.C. 154(b) by 222 days.

(21) Appl. No.: 13/008,126

(22) Filed: Jan. 18, 2011

(65) Prior Publication Data

US 2011/0183141 A1    Jul. 28, 2011

Related U.S. Application Data

(60) Provisional application No. 61/282,317, filed on Jan. 22, 2010.

(51) Int. Cl.
*B32B 5/16*     (2006.01)
*C08L 1/02*     (2006.01)
*C09D 101/02*   (2006.01)

(52) U.S. Cl.
USPC ............... 428/402; 106/163.01; 106/165.01; 106/204.01; 428/403

(58) Field of Classification Search
USPC ............... 428/402, 403; 106/163.01, 165.01, 106/204.01
See application file for complete search history.

(56) References Cited

U.S. PATENT DOCUMENTS

| | | | |
|---|---|---|---|
| 2010/0148118 A1* | 6/2010 | Beck et al. | 252/182.12 |
| 2011/0290149 A1* | 12/2011 | Beck et al. | 106/163.01 |
| 2012/0000392 A1* | 1/2012 | Mukai et al. | 106/163.01 |
| 2012/0041183 A1* | 2/2012 | Hu et al. | 530/502 |

OTHER PUBLICATIONS

Hatakeyama et al., Non-freezing water content of mono- and divalent cation salts of polyelectrolyte-water systems studied by DSC (Thermochimica Acta 253 (1995) 137-148.*
Li et al., A method of preparing spherical nano-crystal cellulose with mixed crystalline forms of cellulose I and II, Chinese Journal of Polymer Science, vol. 19, No. 3 (2001), 291-296.*
Xiong et al., Comparing microcrytalline with spherical nanocrystalline cellulose from waste cotton fabrics, Cellulose (2012) 19:1189-1198; DOI 10.1007/s10570-012-9730-4.*

(Continued)

*Primary Examiner* — Hoa (Holly) Le
(74) *Attorney, Agent, or Firm* — Norton Rose Fulbright Canada LLP

(57) ABSTRACT

Dried nanocrystalline cellulose (NCC), in particular films of NCC, of controlled water dispersibility and a method to control the dispersibility of dried NCC by controlling electrolyte solution ionic strength and ion valency is described. Neutral M-NCC suspensions containing monovalent counterions (e.g., $M=Na^+$, $K^+$, $NH_4^+$, $Et_4N^+$) produced by neutralization of acid-form NCC (H-NCC) with the appropriate hydroxide, are readily dispersible in water when fully dried; this is in contrast to H-NCC. The dispersion of dried M-NCC in aqueous media is effectively prevented by a combination of (1) increased electrolyte concentration and ionic strength, and (2) higher valency of the cation component of the dissolved salt. Additionally, pre-treatment of dried M-NCC films with an electrolyte solution having a polyvalent cation, for example a divalent or trivalent cation is sufficient to prevent the subsequent dispersion of the M-NCC film in pure water.

20 Claims, 4 Drawing Sheets

(56) References Cited

OTHER PUBLICATIONS

Dong, X.M. and Gray, D.G., Effect of counterions on ordered phase formation in suspensions of charged rodlike cellulose crystallites, Langmuir 13 (8): 1997, pp. 2404-2409.

Towers, M. and Scallan, A.M., Predicting the ion-exchange of kraft pulps using Donnan theory, J. Pulp Pap. Sci. 22 (9): 1996, pp. J332-J337.

Revol, J.-F., Godbout, L. and Gray, D.G., Solid self-assembled films of cellulose with chiral nematic order and optically variable properties, J. Pulp Pap. Sci. 24 (5): 1998, pp. 146-149.

Nakamura, K., Nishimura, Y., Hatakeyama, T., and Hatakeyama, H., Thermal properties of water-insoluble alginate films containing di- and trivalent cations, Thermochim. Acta 267: 1995, pp. 343-353.

Nokhodchi, A, and Tailor, A., In situ cross-linking of sodium alginate with calcium and aluminum ions to sustain the release of theophylline from polymeric matrices, II Farmaco 59: 2004, pp. 999-1004.

Davies, C. W., Ion Association; Butterworths 1962, pp. 150-161.

Laka, M. et al. "Properties of microcrystalline cellulose gels formed in salt solutions" Cellulose Chemistry and Technology, 35(5-6). pp. 409-416. Sep. 30, 2001.

Habibi, Y. et al. "Cellulose Nanocrystals: Chemistry, Self-Assembly, and Applications" Chemical Review. 110. pp. 3479-3500. Apr. 3, 2010.

Dong, X.M., Gray, D.G. "Effect of counterions on ordered phase formation in suspensions of charged rodlike cellulose crystallites." Langmuir. 13(8) pp. 2404-2409. Apr. 16, 1997.

International Search Report, PCT/CA2011/000055, Apr. 5, 2011.

\* cited by examiner

DRIED NANOCRYSTALLINE CELLULOSE OF CONTROLLABLE DISPERSIBILITY AND METHOD THEREFOR

CROSS-REFERENCE TO RELATED APPLICATION

This application claims the benefit under 35 USC 119(e) of U.S. Provisional Application Ser. No. 61/282,317, filed Jan. 22, 2010.

FIELD OF THE INVENTION

This invention relates to dried forms of nanocrystalline cellulose (NCC) of controlled dispersibility in water; and a method of rendering a water-dispersible dried form of NCC non-dispersible or of modified dispersibility in water; in particular the invention is concerned with dried M-NCC films which are not dispersible in water and which have advantages over corresponding H-NCC films, where M is a neutral cation.

BACKGROUND OF THE INVENTION

Nanocrystalline cellulose suspensions produced by sulfuric acid hydrolysis (i.e. the H-NCC form) are not dispersible in water or other aqueous solvents once they have been fully dried. When the proton counterion $H^+$ is exchanged for monovalent cationic counterions $M^+$, dried forms of M-NCC can spontaneously redisperse in water to give suspensions with properties similar to those of the native suspensions after sonication treatment [1].

As examples of water-dispersible M-NCC, suspensions of Na-NCC, K-NCC, Cs-NCC, $NH_4$-NCC, $Et_4N$-NCC, (tetraethylammonium$^+$-NCC) $Bu_3MeN$-NCC (tributylmethylammonium$^+$-NCC), $Bu_4N$-NCC (tetrabutylammonium$^+$-NCC), and $Hex_4N$-NCC (tetrahexylammonium$^+$-NCC) are produced by titrating H-NCC suspensions with the solutions of the appropriate hydroxide to neutral pH. The resulting M-NCC suspensions may be dried by several methods, including freeze-drying, spray drying and casting into self supporting films or coatings on substrates. These dried forms of NCC disperse in deionized water to give colloidal suspensions of NCC.

While H-NCC films have the advantage of being non-dispersible in water not shared by the aforementioned M-NCC films, they do not display other advantages associated with M-NCC films.

Industrially, aqueous suspensions of NCC will have to be dried in order to transport and store large quantities of NCC. The dried NCC must therefore be fully redispersible in water for applications that require the use of aqueous suspensions having the full expression of the unique properties of NCC. The drying process must also not interfere with the intrinsic/inherent properties of the NCC particles themselves and/or those of the resulting aqueous NCC suspension. The sodium form of NCC, Na-NCC (obtained by stoichiometrically exchanging the protons of the original acid form H-NCC with sodium, e.g., by neutralization with NaOH), is the form of choice for this purpose. It is completely redispersible in water, much more thermally stable than H-NCC (thermal decomposition begins at 300° C. for Na-NCC as opposed to 180° C. for H-NCC) and does not undergo self-catalyzed desulfation (loss of negatively charged surface sulfate ester groups which result in the electrostatic stability of aqueous NCC suspensions) or degradation of the cellulose upon drying and during prolonged storage of the dried material.

It appears likely that Na-NCC will be widely used in industry as the initial form of NCC from which products will be manufactured. However, its dispersibility in water may not be desirable in many applications, while the thermal and chemical stability may well be. As such, dried Na-NCC has some advantages but also some disadvantages relative to dried H-NCC.

SUMMARY OF THE INVENTION

It is an object of this invention to provide a dried form of nanocrystalline cellulose (M-NCC), particularly (but not limited to) a solid film, in which water dispersibility is controlled, and it is a particular object to provide such a film which is non-dispersible in water but which retains advantages of a corresponding water-dispersible film from which it may be derived.

It is another object of this invention to provide a method of controlling dispersibility in water of a water-dispersible dried form of M-NCC such as a solid film, and it is a particular object to provide such a method in which a water-dispersible film is converted to a film which is non-dispersible in water but which retains advantages of a corresponding water-dispersible film from which it may be derived.

In one aspect of the invention, there is provided a nanocrystalline cellulose (M-NCC) in a dried form in which monovalent cations $M^+$ of an M-NCC water-dispersible dried form are at least partially replaced by polyvalent cations and mixtures thereof, whereby the water dispersibility is at least reduced.

In another aspect of the invention, there is provided a method of controlling dispersibility in water of a water-dispersible M-NCC in a dried form in which M is a monovalent cation $M^+$ comprising: pre-treating said dried form with an electrolyte solution containing polyvalent cations and mixtures thereof, to at least partially replace the monovalent cations by said polyvalent cations.

By adjusting the content of the monovalent cations by replacing them with the polyvalent cations, the water dispersibility of the dried form may be controlled, more especially by a shift from water-dispersible to different levels of dispersibility or non-dispersibility culminating in complete non-dispersibility.

In this way, the advantages associated with, for example, water-dispersible Na-NCC films may be retained in a film which is non-dispersible in water; and disadvantages associated with H-NCC films which are also non-dispersible in water, are avoided.

DETAILED DISCLOSURE OF THE INVENTION

In this Specification, "dried form" with reference to NCC refers to a physical form of NCC produced by manipulation of a suspension of the NCC in a liquid vehicle such that the NCC passes from the suspension to a dry solid form in which the liquid vehicle of the suspension has been removed or essentially removed. Such dry solid forms include self-supporting films, sheets, pellets, threads or filaments, powders, flakes or platelets or a coating on a support. The manipulation includes, for example, casting a film of the suspension and drying the cast film by evaporation, for example by drying in air at a temperature at which the cast film remains viable and retains its film form, typically the temperature will be below a temperature at which the cast film form is disturbed by boiling of the liquid vehicle, and thus typically will be a temperature below to 100° C. for an aqueous suspension and may conveniently be ambient temperature, or drying the suspension by freeze drying or spray drying to remove the liquid vehicle and leave a dried form of the NCC. A cast film may be a self-supporting film, or may be a coating on a support, for example a paper, metal, or plastic object; the object may be planar or flat such as a sheet or may be a shaped article with flat or non-flat surfaces or faces. The invention is further described and illustrated hereinafter by reference to the particular embodiment in which the dried form is a film and more especially a self-supporting film, but the teachings apply equally to other dried forms such as those mentioned hereinbefore.

A film of M-NCC such as Na-NCC can be converted to a polyvalent ion form, e.g., Ca-NCC, in accordance with the invention by brief treatment with a relatively dilute $CaCl_2$ solution.

It is much easier, and less costly, on an industrial scale, to spray a dilute $CaCl_2$ solution onto a dried NCC film than to use an acid solution such as HCl or $H_2SO_4$ to spray the film (or alternatively to use an $H^+$-form cation exchange resin to reconvert the dispersed Na-NCC suspension to H-NCC prior to drying). It is also less harmful to the environment.

The exchange of $Na^+$ for $Ca^{2+}$ is rapid, often occurring in less than 1 minute when immersing a thin film in $CaCl_2$ solution.

It is possible that only the outer layers of a thicker Na-NCC film need to be exchanged for a polyvalent ion form such as Ca-NCC to prevent dispersion.

The polyvalent ion form such as Ca-NCC film thus produced retains the optical properties and the thermal and physicochemical stability of the Na-NCC film.

A non-dispersible plasticized film may possibly be produced from plasticized Na-NCC films in this way.

The polyvalent cations are in particular neutral ions, for example metal cations and may be for example divalent cations $M^{2+}$, trivalent cations $M^{3+}$, tetravalent cations $M^{4+}$ or a mixture of two or more thereof. Other "multivalent" ions that can act as a polyvalent cation may include polyelectrolytes (polymer chains having ionic charges distributed along their length; each charge may be monovalent or higher, e.g. divalent, etc., but the numerous charges can allow the polymer chain to act as a bridging agent) such as cationic starches and polyamines or proteins (e.g., bovine serum albumin) having a pKa sufficiently high (i.e., above that of the acidic sulfate ester and carboxylic acid groups attached to the NCC particles) to allow them to be cationic in the presence of the anionic NCC particles. Proteins having a pI or pKa high enough to be cationic while NCC remains anionic are of particular interest. The pKa of NCC is between 3 and 4; proteins having a pKa or pI above 3, such as bovine serum albumin are thus of special interest.

Typical polyvalent cations are $Ca^{2+}$, $Cu^{2+}$, $Mg^{2+}$, $Zn^{2+}$, $Ni^{2+}$, $Fe^{3+}$, $Sn^{4+}$, $Pb^{4+}$ and $Ti^{4+}$. Preferred divalent cations are $Ca^{2+}$ and $Cu^{2+}$; and a preferred trivalent cation is $Al^{3+}$; mixtures of polyvalent cations are within the scope of the invention.

Dispersibility of Dried NCC in Aqueous Electrolyte Solutions

When placed in aqueous solutions of electrolytes composed of a monovalent cation and anion, Na-NCC films retain their structure at solution ionic strengths $$I = \frac{1}{2}\sum_{i=1}^{n} c_i z_i^2,$$

where $c_i$ is the molar concentration of ionic species i, $z_i$ is the charge number of that ionic species, and the sum is taken over all n ionic species in the solution) ≥ 10 mM, regardless of the solution pH (e.g., in HCl, NaOH, or NaCl). At high enough ionic strengths (~2 M), the films do not swell greatly and are not dispersible, although the iridescence always shifts to longer wavelengths.

At a given molar concentration, electrolytes containing a divalent or trivalent cation or anion (e.g., $Na_2SO_4$, $CaCl_2$, $CuSO_4$, $Al(NO_3)_3$) are found to be more effective in preventing dispersion or swelling of dried M-NCC than those with only monovalent ions such as NaCl or KCl, due to their higher ionic strength and, where applicable, the bridging action of a polyvalent cation as described below.

At a given ionic strength, electrolytes containing a divalent or trivalent cation (e.g., $CaCl_2$, $CuSO_4$, $Al(NO_3)_3$), in accordance with the invention, are more effective in preventing dispersion than electrolytes with monovalent cations (e.g., NaCl, KCl). In contrast, anion valency does not affect the dispersion of the Na-NCC film; only polyvalent cations contribute to the bridging mechanism described below. Results are given in Table 1, in Table 2 and in FIG. 1.

There appear to be two different mechanisms of dried NCC film dispersion prevention in electrolyte solutions:

(a) For all dissolved ionic species, regardless of valency, electrolyte-induced gelation effects of the polyelectrolytic NCC caused by the Donnan equilibrium [2] prevent dispersion of Na-NCC (or other water-dispersible M-NCC) films or other forms of dried NCC. It is known that added NaCl causes gelation in aqueous biphasic NCC suspensions [3], the minimum ionic strength needed to cause gelation decreasing with increasing NCC concentration. Because solid forms of NCC such as films have a very high effective NCC concentration, much lower electrolyte concentrations can prevent their dispersion. The counterions associated with the sulfate ester groups at the NCC surface create an ionic imbalance between the interior of the film structure and the surrounding aqueous media, causing the aqueous solution (water, dissolved cations and anions) to penetrate the film structure. Once inside the film, the electrolyte solution produces two competing effects, swelling (caused by water disrupting the NCC layers) and gelation (caused by the electrolyte ions screening the electrostatic repulsion between adjacent anionic NCC particles). The higher the ionic strength of the solution which surrounds the film, the greater will be the tendency of the dissolved ions to cause gelation of the NCC film, reducing swelling and preventing dispersion of the film.

(b) In addition to this Donnan equilibrium gelation effect, divalent and trivalent cations are also able to form "bridges" between two or three (monovalent) sulfate ester groups on separate NCC particles, and are therefore more effective at preventing dispersion of dried NCC films and other forms. Divalent and trivalent cations are also more likely to remain within the solid NCC film structure if it is then placed in pure water.

These mechanisms may be exploited separately and brought out as two different ways of achieving changed barrier properties and dispersibility of dried NCC films.

Effect of Electrolyte Solution Pre-Treatment on Dried NCC Dispersibility in Water If a water-dispersible Na-NCC film (for example) is soaked in an electrolyte solution containing a divalent or trivalent cation that is of sufficient concentration/ionic strength, and then placed in pure water, it will no longer disperse. As described above, divalent or trivalent cations form bridges or cross-links between two sulfate ester groups on the NCC particle surfaces, effectively causing there to be ion exchange with the original sodium counterions and forming cationic bridges between NCC particles. FIG. 2 illustrates the dispersibility of Na-NCC films pre-treated in this way. Pre-treatment with dilute (50 mM) $Ca^{2+}$ solutions prevents dispersion of the treated film in pure water, while pre-treatment with very high ionic strength (4.3 M) solutions of monovalent cations such as $Na^+$ does not. This type of counterion exchange has been described in the literature and used to cross-link and prevent dispersion of alginate films [4,5].

A minimum pre-treatment time is necessary, depending on the electrolyte concentration: Counterion exchange is rapid, occurring in approximately one minute for an Na-NCC film that is 90 μm thick placed in 50 mM $CaCl_2$ (see FIG. 3), it may be very brief (<10 s) in concentrated electrolyte solutions (see Table 3). The exchange is also reversible if the film is not dried. For example, if the newly-formed Ca-NCC film is immediately exposed to concentrated NaCl solution (or to another concentrated electrolyte), a (water-dispersible) Na-NCC film will be re-formed. The higher the concentration or ionic strength of the electrolyte solution with which the Na-NCC film is treated, the less swelling occurs when the film is placed in pure water (see FIG. 4). Results are summarized in Table 4 for various electrolytes having ions of different valencies.

Effect of Counterions on Dried M-NCC Dispersibility

The nature of the M-NCC counterion also affects the dispersibility of the dried product in aqueous electrolyte solutions. Two series of cations were examined: monovalent alkali cations ($Na^+$, $K^+$, $Cs^+$) and monovalent organic ammonium counterions ($NH_4^+$, $Et_4N^+$, $Bu_3MeN^+$, $Bu_4N^+$, and $Hex_4N^+$). The resistance of dried NCC films to dispersion in water has been examined and appears to be slightly improved as the hydration number of the alkali counterions decreases (in the order $Na^+ > K^+ > Cs^+$[6]) [1]. In the case of monovalent organic counterions, the effects of hydrophobicity and steric repulsion should compete: Longer hydrocarbon chains are more hydrophobic and repel water better, but also experience greater steric repulsion, which will tend to prevent the close approach of M-NCC particles, weakening the inter-NCC hydrogen bond network and thereby facilitating the penetration of water into the film structure. It was found that the dispersibility properties in electrolyte solutions of dried M-NCC films with organic counterions are minimally affected compared to M-NCC films with alkali counterions (data not shown). In addition, high counterion hydrophobicity slightly reduces the effectiveness of electrolyte solution pre-treatment (e.g., 50 mM $CaCl_2$) in preventing NCC film dispersion in pure water compared to less hydrophobic counterions, as shown in Table 5. For example, after a 1-min pre-treatment in 50 mM $CaCl_2$ solution, complete ion exchange was achieved in an Na-NCC film, while ion exchange was only 78% complete in a $Hex_4N$-NCC film (data not shown). It is, however, reasonable to suppose that a further 60 s in the $CaCl_2$ solution would result in a complete exchange. While the nature of the counterions examined here does not significantly affect the dispersibility of the dried product in aqueous solutions, other organic counterions $M^+$ may reduce the dispersibility to a greater extent.

A new range of uses for NCC barrier films may be envisioned based on the results presented here. For example, an Na-NCC film in which differently-coloured areas or patterns have been produced, for example, thermally during casting (U.S. Ser. No. 12/591,906) or by other means may be treated with a more dilute $CaCl_2$ solution (e.g., 50 mM), which will not affect the final colour and will prevent dispersion of the film in water. NCC films resulting from counterion exchange of e.g. Na-NCC films with e.g. $CaCl_2$ solutions have the advantage of retaining the thermal and physicochemical stability properties of the original, water-dispersible, films while being non-water dispersible. It should be noted that very swollen NCC films are quite fragile and likely do not possess barrier properties; high ionic strength solutions of divalent or trivalent cations are the most likely to maintain the films' structural integrity and barrier properties. The film behaviour may be different if supported (i.e., as a coating) or plasticized.

EXAMPLES

TABLE 1

Figure 1:
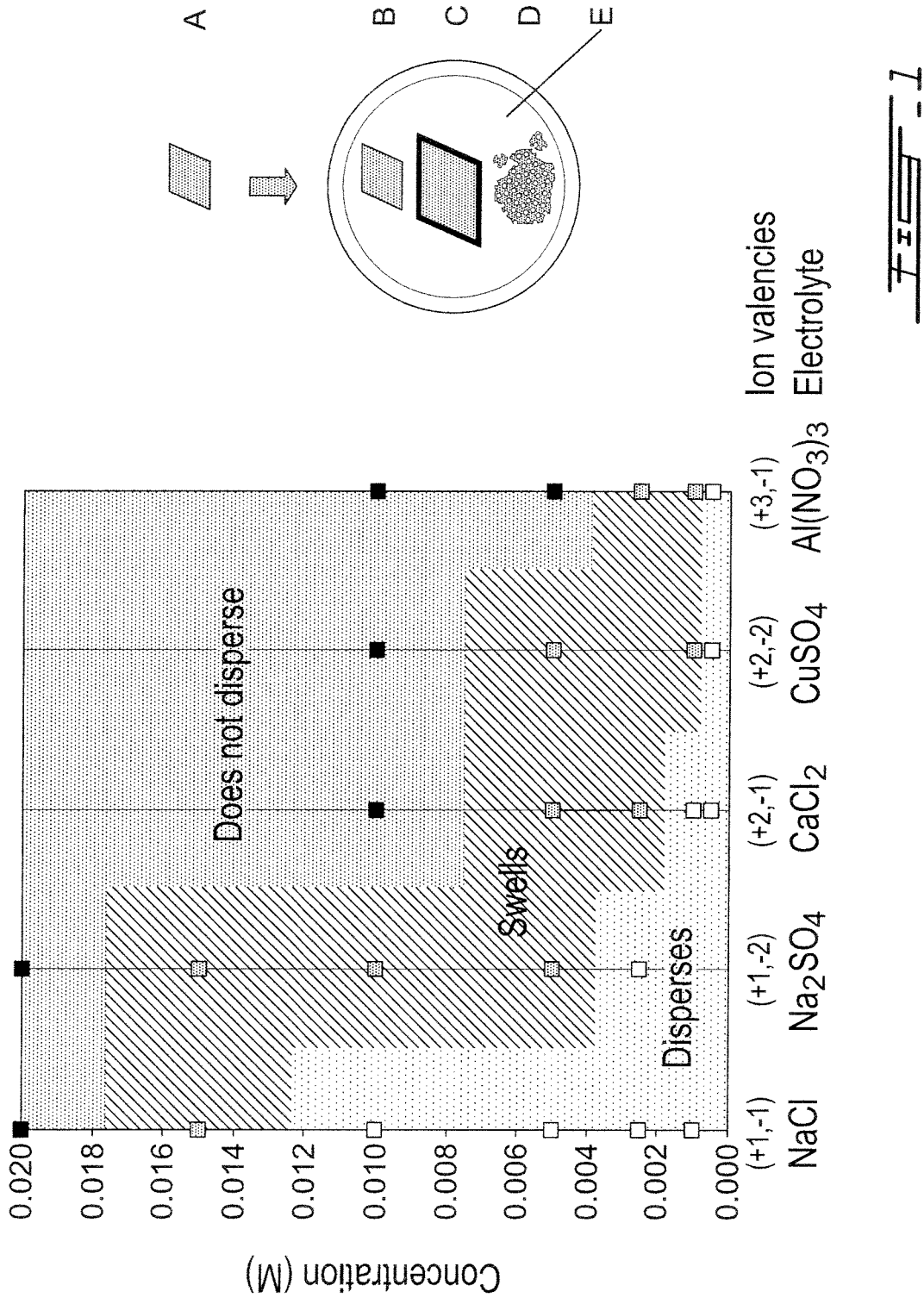
FIG. 1 is a diagram illustrating the dispersibility after 24 h in various electrolyte solutions of different concentration of solid Na-NCC films. A solid Na-NCC film A is placed in the electrolyte solution E and after 24 h, may retain its unswollen structure B, become swollen but remain structurally intact C, or disintegrate and/or disperse in the aqueous medium, D.
Figure 2:
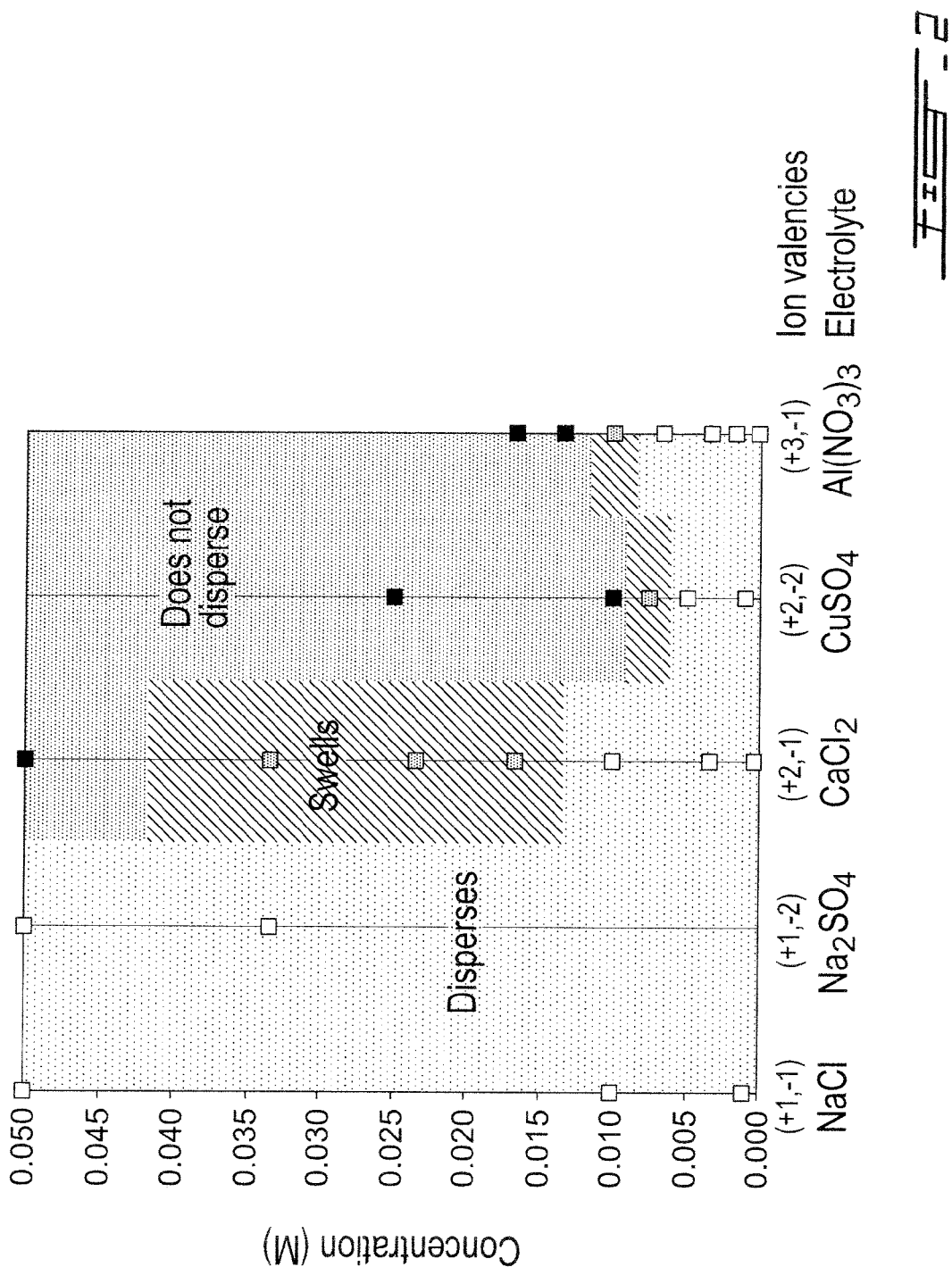
FIG. 2 is a diagram illustrating the dispersibility in water of Na-NCC films exposed for 1 min to electrolyte solutions of different concentrations.
Figure 3:
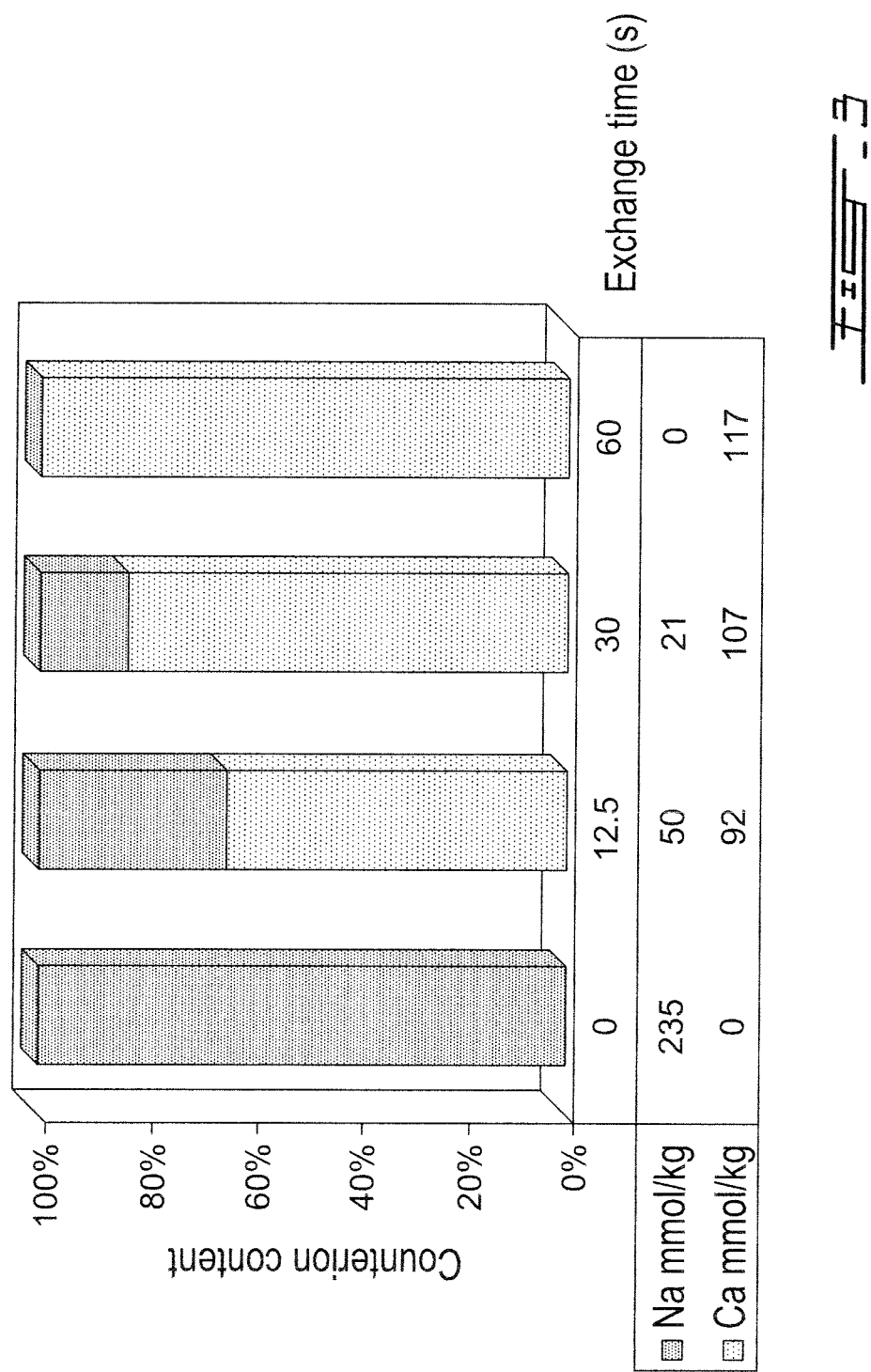
FIG. 3 is a graph illustrating the exchange of calcium ions with sodium ions when treating a ~90 μm-thick Na-NCC film with a 50 mM $CaCl_2$ solution for different times.
Figure 4:
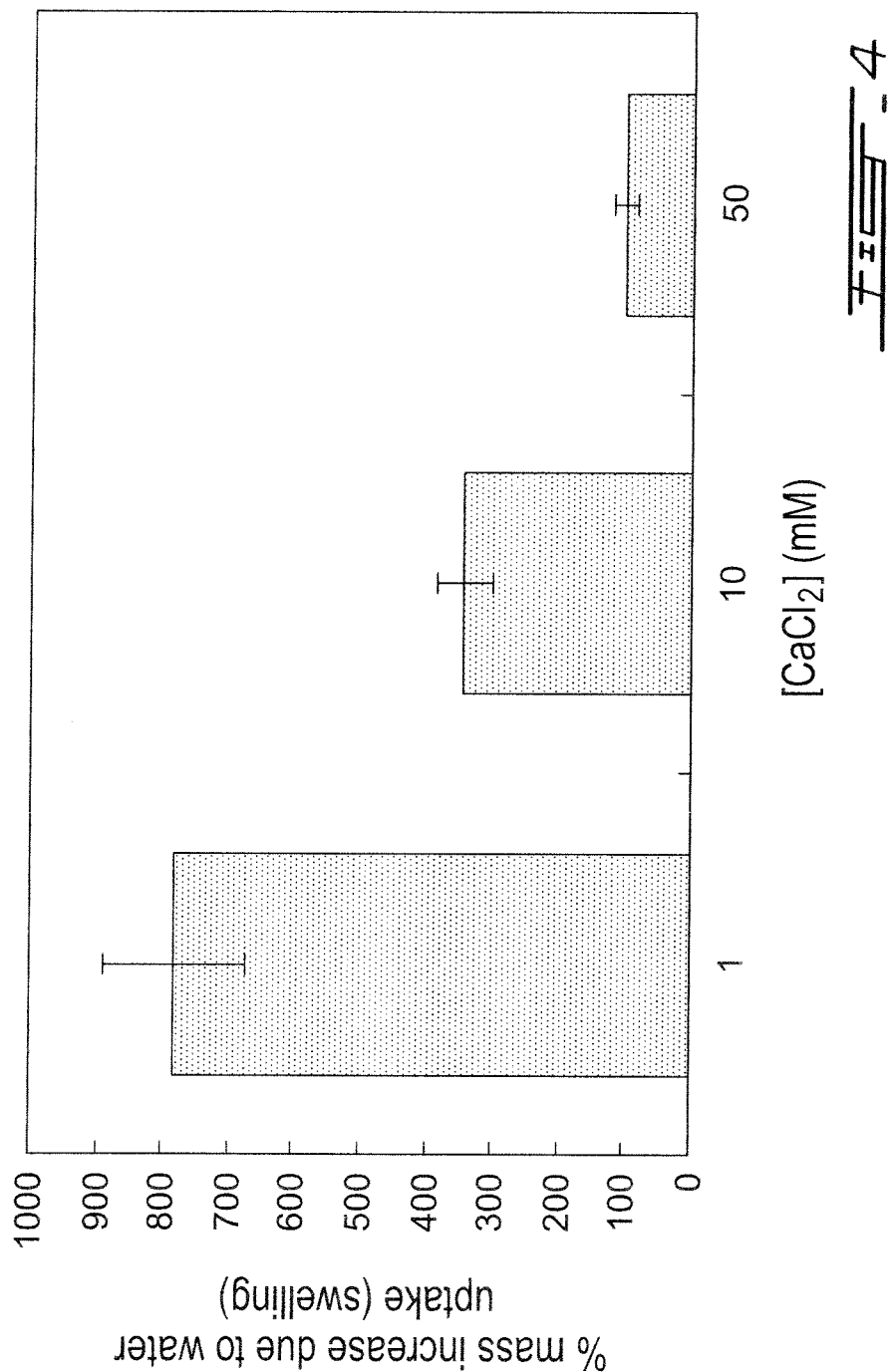
FIG. 4 is a graph illustrating the mass increase due to swelling of an Na-NCC film placed for 30 s in de-ionized water following a 30-s pre-treatment in $CaCl_2$ (aq) solutions.

Dispersion of Na-NCC film in electrolyte solutions containing monovalent cations.

| Salt | C (mM) | Swelling after 5 min[a] | Dispersion after 18 h[b] |
|---|---|---|---|
| NaCl | 1 | Strong, immediate | 30 min |
| KCl | 1 | Strong, immediate | 30 min |
| $Na_2SO_4$ | 1 | Strong, immediate | 2 h[c] |
| NaCl | 15 | Moderate, within 1 min | N |
| KCl | 15 | Moderate, within 1 min | N |
| $Na_2SO_4$ | 15 | Slight | N |

[a]Relative degree of swelling and time at which it becomes noticeable.
[b]Overnight, undisturbed samples; time to dispersion indicated in parentheses.
[c]Undisturbed films break apart within 20 min.

TABLE 2

Dispersion of Na-NCC film in electrolyte solutions containing di- and trivalent cations.

| Salt | C (mM) | Swelling after 5 min[a] | Dispersion after 18 h |
|---|---|---|---|
| $CaCl_2$ | 1 | Gel | Y |
| $CuSO_4$ | 1 | Gel | Y |
| $Al(NO_3)_3$ | 1 | Slight | N |
| $CaCl_2$ | 10 | Minimal[b] | N |
| $Al(NO_3)_3$ | 10 | Minimal[b] | N |

[a]Relative degree of swelling after 5 min in solution.
[b]Film becomes transparent and colourless (infrared [IR] range iridescence) but does not swell visibly.

TABLE 3

Effect of $CaCl_2$ solution pre-treatment on the dispersibility of an Na-NCC film in pure water.

| [$CaCl_2$] (M) | Time in aq. $CaCl_2$ (s) | Swelling in water | Dispersion in water |
|---|---|---|---|
| 0.10 | <1[a] | Y | Y |
| | 1 | Y | Y |
| | 5 | Y | Y |
| | 10 | Y | Y |
| | 20 | Y | N |
| | 30 | N[b] | N |

TABLE 3-continued

Effect of CaCl$_2$ solution pre-treatment on the dispersibility of an Na-NCC film in pure water.

| [CaCl$_2$] (M) | Time in aq. CaCl$_2$ (s) | Swelling in water | Dispersion in water |
|---|---|---|---|
| 1.00 | <1$^a$ | N$^b$ | N |
|  | 1 | N$^b$ | N |
|  | 5 | N$^b$ | N |
|  | 10 | N$^b$ | N |
|  | 20 | N$^b$ | N |
|  | 60 | N$^b$ | N |

$^a$Film was immersed as briefly as possible in the electrolyte solution.
$^b$Film swelled only as much as accounted for by the increase in chiral nematic pitch; the degree of swelling decreased as treatment time increased (e.g., a film treated for 60 s in 1M CaCl$_2$ showed red/gold iridescence, while the same film treated for 5 s in 1M CaCl$_2$ was transparent and colourless (in the IR region)).

TABLE 4

Changes in Na-NCC film structure over time when left undisturbed in pure water following 1 min pre-treatment in the electrolyte solutions indicated.

| Salt | Concentration (mM) | Ionic strength (mM) | t = 1 min | 30 min | 120 min |
|---|---|---|---|---|---|
| none | — | — | swollen | swollen gel | dispersed |
| NaCl | 100 | 100 | swollen | partially dispersed | dispersed |
| Na$_2$SO$_4$ | 33 | 100 | swollen gel | mostly dispersed | dispersed |
|  | 100 | 300 | swollen | partially dispersed | dispersed |
| CaCl$_2$ | 3.33 | 10 | swollen gel | dispersed | dispersed |
|  | 10 | 30 | slightly swollen | very swollen | dispersed |
|  | 33 | 100 | slightly swollen | slightly swollen | slightly swollen |
|  | 100 | 300 | no change$^a$ | no change | no change |
| CuSO$_4$ | 100 | 400 | no change$^a$ | no change | no change |
| Al(NO$_3$)$_3$ | 1.67 | 10 | swollen | dispersed | dispersed |
|  | 16.7 | 100 | no change$^a$ | no change | no change |

$^a$"No change" indicates that the film does not swell visibly, although it may become transparent (IR range).

TABLE 5

Dispersibility in pure water (after ≤18 h) of dried M-NCC containing neutral monovalent counterions, following 1 min pre-treatment in electrolyte solutions.

| Counterion (M$^+$) | 4.3M NaCl | 10 mM CaCl$_2$ | 25 mM CaCl$_2$ | 50 mM CaCl$_2$ |
|---|---|---|---|---|
| Na$^+$ | D | D (~2 h) | S | ND |
| K$^+$ | D | D (~2 h) | s | ND |
| Cs$^+$ | D | D (~2 h) | s | ND |
| NH$_4^+$ | D | D (1-2 h) | D (~2 h) | s |
| Et$_4$N$^+$ | D | D (1-2 h) | S | s |
| Bu$_3$MeN$^+$ | D | D (1-2 h) | S | S |
| Hex$_4$N$^+$ | D | D (1-2 h) | D (~2 h) | D |

D = dispersion,
S = moderate swelling,
s = minimal swelling,
ND = no dispersion or visible swelling.
Times in parentheses indicate time to dispersion.

REFERENCES

1. Dong, X. M. and Gray, D. G. "Effect of counterions on ordered phase formation in suspensions of charged rodlike cellulose crystallites," *Langmuir* 13 (8): 2404-2409 (1997).
2. Towers. M. and Scallan, A. M. "Predicting the ion-exchange of kraft pulps using Dorman theory," *J. Pulp Pap. Sci.* 22 (9): J332-J337 (1996).
3. Revol, J.-F., Godbout, L. and Gray, D. G. "Solid self-assembled films of cellulose with chiral nematic order and optically variable properties," *J. Pulp Pap. Sci.* 24 (5): 146-149 (1998).
4. Nakamura. K. Nishimura, Y., Hatakeyama, T., Hatakeyama, H. "Thermal properties of water-insoluble alginate films containing di- and trivalent cations," *Thermochim. Acta* 267: 343-353 (1995).
5. Nokhodchi, A, Tailor, A. "In situ cross-linking of sodium alginate with calcium and aluminum ions to sustain the release of theophylline from polymeric matrices," *Il Farmaco* 59: 999-1004 (2004).
6. Davies, C. W. *Ion Association*; Butterworths 1962, p. 150.

As of 2012 the International Organisation for Standardization (ISO) proposes that the terminology "nanocrystalline cellulose (NCC)" which is employed herein, be changed to . . . cellulose nanocrystals (CNC) . . . .

The invention claimed is:

1. A nanocrystalline cellulose (M-NCC) in a dried form, in which monovalent cations M$^+$ of an M-NCC water-dispersible dried form are at least partially replaced by polyvalent cations, whereby the water dispersibility is at least reduced.

2. The nanocrystalline cellulose (M-NCC) in a dried form according to claim 1, wherein the dried form is a self-supporting film, sheet, powder, flakes or platelets.

3. The nanocrystalline cellulose (M-NCC) in a dried form according to claim 1, wherein the dried form is a self-supporting film.

4. The nanocrystalline cellulose (M-NCC) in a dried form according to claim 3, wherein said monovalent cations M$^+$ are completely replaced by polyvalent cations selected from the group consisting of divalent cations M$^{2+}$ and trivalent cations M$^{3+}$.

5. The nanocrystalline cellulose (M-NCC) in a dried form according to claim 1, wherein the dried form is a coating on a support.

6. The nanocrystalline cellulose (M-NCC) in a dried form according to claim 5, wherein said monovalent cations M$^+$ are completely replaced by polyvalent cations selected from the group consisting of divalent cations M$^{2+}$ and trivalent cations M$^{3+}$.

7. The nanocrystalline cellulose (M-NCC) in a dried form according to claim 1, wherein said monovalent cations M$^+$ are completely replaced by divalent cations M$^{2+}$.

8. The nanocrystalline cellulose (M-NCC) in a dried form according to claim 7, wherein said divalent cations M$^{2+}$ are selected from Ca$^{2+}$ and Cu$^{2+}$.

9. The nanocrystalline cellulose (M-NCC) in a dried form according to claim 1, wherein said monovalent cations $M^+$ are completely replaced by trivalent cations $M^{3+}$.

10. The nanocrystalline cellulose (M-NCC) in a dried form according to claim 9, wherein said trivalent cations $M^{3+}$ are $Al^{3+}$.

11. The nanocrystalline cellulose (M-NCC) in a dried form according to claim 1, wherein said polyvalent cations comprise polymer chains having cationic charges distributed along their length; each ionic charge being monovalent or higher such that the polymer chain is polyvalent.

12. A method of controlling dispersibility in water of a water-dispersible M-NCC in a dried form, in which M is a monovalent cation $M^+$ comprising: pre-treating said dried form with an electrolyte solution containing polyvalent cations, to at least partially replace the monovalent cations by said polyvalent cations.

13. A method according to claim 12, wherein said pre-treating comprises immersing said dried form in said electrolyte solution.

14. A method according to claim 12, wherein said pre-treating comprises spraying said dried form with said electrolyte solution.

15. A method according to claim 12, wherein said polyvalent cations are selected from the group consisting of divalent cations $M^{2+}$, trivalent cations $M^{3+}$, tetravalent cations $M^{4+}$ and mixtures of two or more thereof.

16. A method according to claim 12, wherein said dried form is a self-supporting film, sheet, powder, flakes or platelets or a coating on a support.

17. A method according to claim 12, wherein said dried form is a self-supporting film.

18. A method according to claim 12, wherein said dried form is a coating on a support.

19. A method according to claim 12, wherein said polyvalent cations are selected from the group consisting of $Ca^{2+}$, $Cu^{2+}$ and $Al^{3+}$.

20. A method according to claim 12, wherein said polyvalent cations comprise polymer chains having cationic charges distributed along their length; each ionic charge being monovalent or higher such that the polymer chain is polyvalent.

* * * * *